(No Model.)
J. F. LOCKWOOD.
GRIDDLE.
No. 554,942.　　　　　　　　　　Patented Feb. 18, 1896.
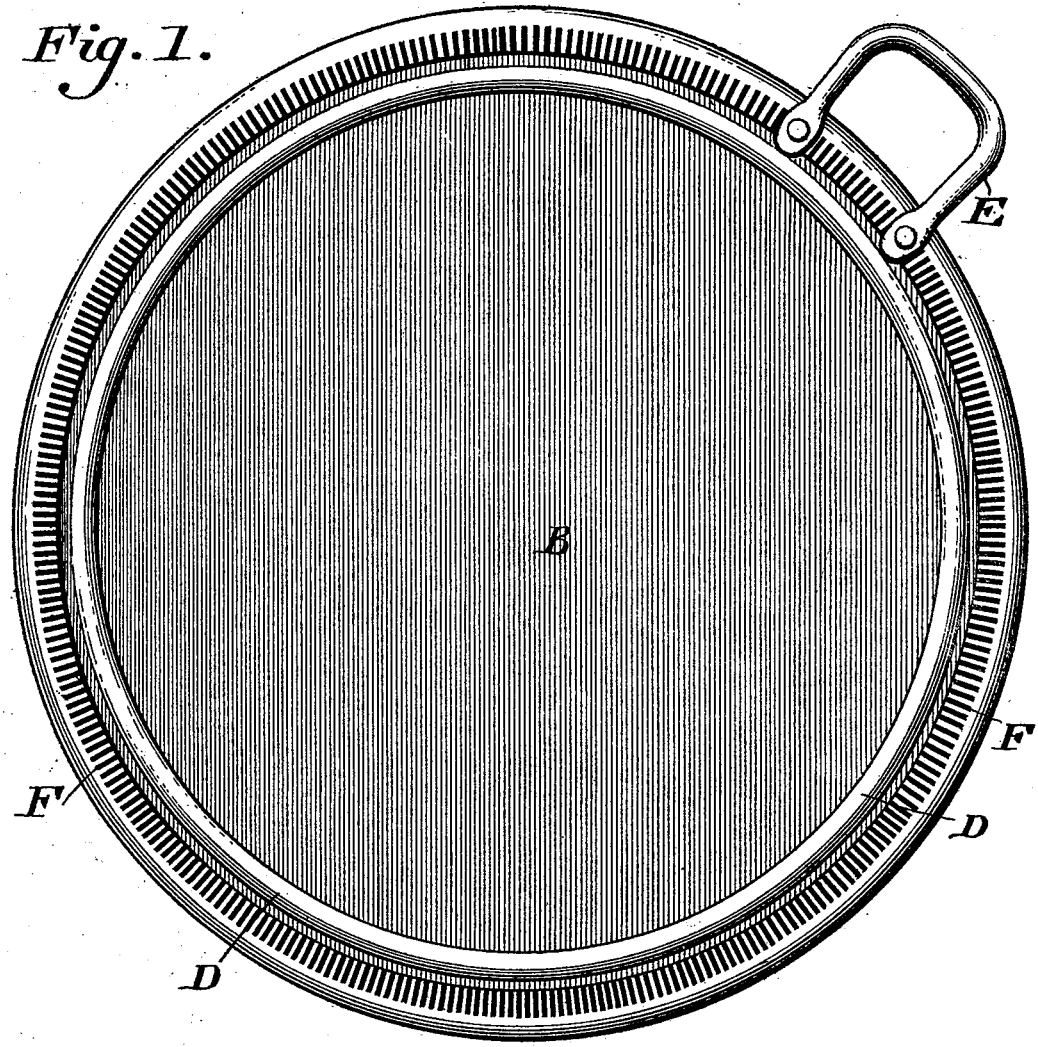
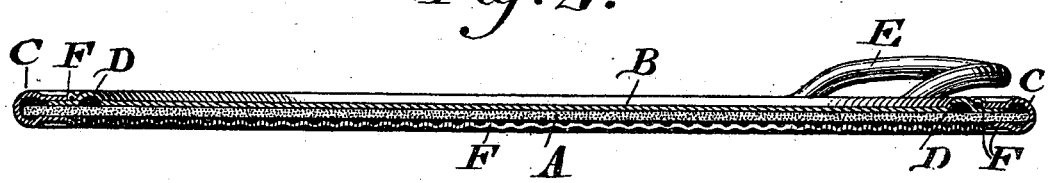
WITNESSES:
P. H. Eagle.
L. Douville.
INVENTOR
James F. Lockwood
BY
ATTORNEY.

UNITED STATES PATENT OFFICE.

JAMES F. LOCKWOOD, OF PHILADELPHIA, PENNSYLVANIA, ASSIGNOR TO ZACHARY T. HALL, OF SAME PLACE.

GRIDDLE.

SPECIFICATION forming part of Letters Patent No. 554,942, dated February 18, 1896.

Application filed January 9, 1894. Serial No. 496,300. (No model.)

*To all whom it may concern:*

Be it known that I, JAMES F. LOCKWOOD, a citizen of the United States, residing in the city and county of Philadelphia, State of Pennsylvania, have invented a new and useful Improvement in Griddles, which improvement is fully set forth in the following specification and accompanying drawings.

My invention consists of a griddle formed of a bottom composed of an uncovered mat of asbestos, a top plate of metal, and a rim, which latter connects said mat and plate and permits the plate to expand and contract without liability to be disconnected, the griddle being fireproof on the lower side and not liable to burn the cakes, toasting bread, &c., on the upper side, it being also pliable, light, strong, and durable, and having a rigidly-connected lifting-plate. The metal plate or disk has a bead thereon near said rim, whereby the hot fat and food material may be retained therein, and when either side of the griddle is placed on the stove an air-space exists between the stove and griddle, thus avoiding scorching or burning of the food and of the griddle.

Figure 1 represents a plan view of a griddle embodying my invention. Fig. 2 represents a transverse section thereof.

Similar letters of reference indicate corresponding parts in the two figures.

Referring to the drawings, A designates a mat of asbestos or equivalent material, and B designates a disk of steel, placed parallel together and having their peripheries embraced by the channeled rim C, which serves to connect the mat and disk as one. On the disk, near the inner periphery of the rim, is a crimped or struck-up bead which extends around the disk and serves to stiffen the peripheral portion of the same, so that while the disk is somewhat flexible in its nature it is prevented from sagging or losing its shape, and so also prevents distortion of the rim C.

E designates a handle which is riveted or otherwise rigidly secured to the rim, whereby the griddle may be conveniently handled, as is evident, it also projecting upwardly and outwardly from said rim, so that the griddle can be raised bodily from the stove or fire without the hand coming in contact with the stove or fire, or avoiding the necessity of placing a knife or other implement under the griddle to lift the same.

The inner periphery of the rim is scalloped or corrugated, as at F, so as to strengthen the same and produce an unbroken outer periphery or edge.

It will be seen that the mat, which is uncovered underneath and exposed to the stove-plate or exposed to the fire, is fireproof and comparatively indestructible, and it removes the disk from direct contact with the fire or hot plates of a stove, range, &c. Hence burning of the food on the disk is prevented, said disk being preferably formed of sheet-steel which may become highly heated, it being light, strong and durable, and inexpensive in its nature.

The edge of the disk is free within the rim, so that the disk may readily expand and contract without control of the rim, and when either side of the griddle is placed on the stove an air-space exists between the parts, which prevents scorching and burning of the food and of the griddle.

Having thus described my invention, what I claim as new, and desire to secure by Letters Patent, is—

A griddle formed of a fireproof mat, a disk of metal, with an upturned bead thereon, and a separate channeled rim, the latter freely embracing the peripheral portions of the mat and disk outside of said bead, forming an air-space on both the upper and lower sides of the griddle, between the same and stove and the bead serving to retain the hot fat and food material within the same, substantially as described.

JAMES F. LOCKWOOD.

Witnesses:
JOHN A. WIEDERSHEIM,
A. P. JENNINGS.